May 24, 1960   J. H. SCHULMAN ET AL   2,937,999
RADIOPHOTOLUMINESCENT SALTS AND DOSIMETERS EMPLOYING SAME
Filed Dec. 31, 1956
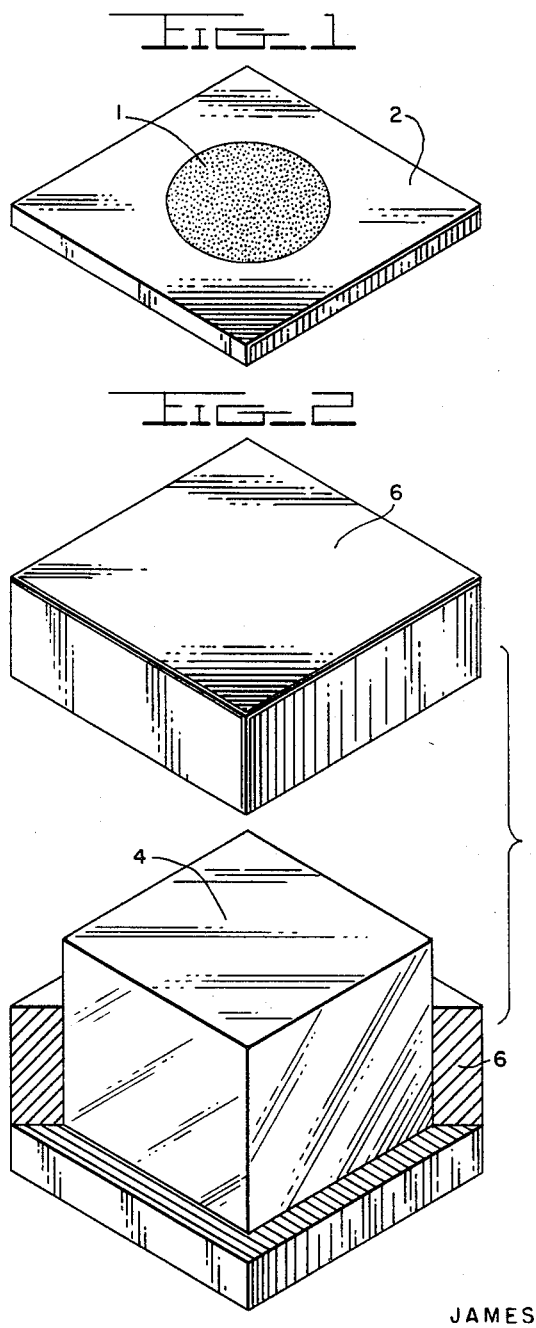
INVENTORS
JAMES H. SCHULMAN
RUSSELL D. KIRK
BY
ATTORNEYS

2,937,999

RADIOPHOTOLUMINESCENT SALTS AND DOSIMETERS EMPLOYING SAME

James H. Schulman, Forest Heights, and Russell D. Kirk, Temple Hills, Md., assignors to United States of America as represented by the Secretary of the Navy Filed Dec. 31, 1956, Ser. No. 631,982

3 Claims. (Cl. 252—301.2)

(Granted under Title 35, U.S. Code (1952), sec. 266)

The invention described herein may be manufactured and used by or for the Government of the United States of America for governmental purposes without the payment of any royalties thereon or therefor.

This invention relates to new radiation sensitive materials, more particularly to new radiophotoluminescent organic compounds for the detection and measurement of high energy radiations such as X-rays, gamma rays, high speed electrons, etc. It also relates to new dosimeters employing the new radiation sensitive compounds.

Radiophotoluminescence in solids, i.e., luminescence changes produced by exposing the solid to ionizing radiations, has been studied almost exclusively in inorganic systems. Whereas these studies have resulted in practical applications in the field of dosimetry, little attention appears to have been given to the radiophotoluminescence of organic compounds.

The present invention is directed to radiation chemistry in the organic field and has as an object, provision of new radiophotoluminescent organic compounds for high energy radiation dosimetry. A further object is to provide radiation dosimeters employing the new radiophotoluminescent compounds. Other objects will become apparent from the description of the invention which follows:

We have found in accordance with our invention that new radiophotoluminescent organic compounds useful in high energy radiation dosimetry are obtained when the o-toluic acid salt of sodium, potassium, lithium, calcium, magnesium, cadmium or lead is co-crystallized from common solution with the benzoic acid salt of a metal of this same group. These new compounds are solid solutions of the o-toluate with the benzoate. The ratio of the component salts of these solid salts solutions may be widely varied, with the o-toluate content thereof being as little as 0.1% by weight, at which content, luminescence of the irradiated solid salt solution is feebly evident. Practically, the proportion of the o-toluate salt in the solid salt solutions may range from about 1 to 90% by weight and preferably is about 60% by weight.

The new salt compounds in the form of their hydrates are effective as ionizing radiation detectors. The o-toluate-benzoate salt of lithium has the added property of being effective in this role as the non-hydrate, also. Exposed to ionizing radiation the new compounds undergo radiochemical change and will then exhibit a yellow-green luminescence under near ultraviolet light, for example, under 365° A. excitation after exposure to X-rays or gamma rays. The intensity of this luminescence, under standard conditions of ultraviolet light inspection, is a function of the dose of the ionizing radiation given to the organic salt compound and may be used as a measure of the dose. The new radiophotoluminescent compounds can be used for the detection and measurement of ionizing radiation at levels of $10^4$ to $10^7$ roentgens, employing an appropriate luminescence intensity measuring means. They are superior to the inorganic crystals and glasses heretofore used for ionizing radiation dosimetry in one or more of the following respects: ability to register higher doses before saturation sets in, less energy dependence, virtually no fading of the dose indication, and economy in materials and preparation.

For reading of the dose of high energy or ionizing radiation from the new radiophotoluminescent salts, one may use either visual comparison with standards of luminesce brightness or photoelectric or other means capable of measuring luminescence intensity. The new salts may be used in the dosimetry as a powder or pellet in loose form or attached to a flat support or lodged in a glass or transparent plastic container of matching refractive index. The o-toluate-benzoate salt of lithium may be imbedded as dispersed fine particles in glass or a solid plastic of matching refractive index. A further way in which the new salts may be used in the dosimetry is to incorporate them in vehicles serving as paints or inks for labeling the surfaces of articles which are to receive radiation treatment, such as cans of food which are to be sterilized by ionizing radiation.

The invention is further described herein with reference to the accompanying drawing which shows two types of dosimeters by which the new radiation sensitive organic compounds can be employed for the detection and recording of ionizing radiation.

In the drawing:

Fig. 1 shows an open type of dosimeter in accordance with the invention, particles of the radiation sensitive material being affixed to a flat support, and Fig. 2 shows another type of dosimeter in accordance with the invention in which the radiation sensitive material in fine particle form is embedded in a clear solid of matching refractive index, and a protective casing therefor in exploded view.

Preparation of the new organic salts of the invention can be carried out in simple fashion by dissolving the starting component salts in the desired proportions in a common solvent, for example, water and conducting the co-crystallization of the component salts following known general practice for crystallizing of salts from solution. The salts which are radiation sensitive in the hydrated form only may be placed in a suitable storage container for retention of the hydrate water therein, or they may be stored in the dry condition and subsequently hydrated by the addition of the calculated small quantity of water thereto prior to employing them for the dosimetry.

The effectiveness of the solid salts solutions of the invention as ionizing radiation detectors which luminesce under near ultraviolet light is dependent on the co-crystallization of the same from the solution of their component salts, as well as the hydrate form of the component salts thereof where indicated. The same result is not obtained by mechanical admixture of the component salts. The individual irradiated component salts either do not luminesce or at most exhibit a feeble emission under the ultraviolet light. Further, the indicated radiation sensitivity is not to be obtained by a mere mechanical admixing of the starting component salts.

The radiophotoluminescent organic salts of the invention may be used in various types of dosimeters as indicated above. The accompanying drawing shows two types of the same.

In Figure 1, the radiophotoluminescent organic salt 1 as a powder is affixed to a flat support 2 of a firm material such as a sheet of cardboard, glass, metal or plastic, by means of a suitable adhesive such as bone glue or a synthetic resin adhesive. The intensity of the luminescence emitted by the irradiated organic salt under excitation by appropriate near ultraviolet light can be determined with a fluorimeter.

Figure 2 shows a dosimeter in which the radiation sensitive element 4 is a dispersion of fine particles of the radiophotoluminescent organic salt in a block of glass or clear plastic of matching refractive index. The block is provided with a pair of opposed flat surfaces. A two part casing 6 of plastic or other durable material which is transparent to ionizing radiation is provided for protecting the sensitive element 4 against chipping and breakage. The irradiated sensitive element 4 is removed from the casing 6 for the purpose of determining the intensity of the luminescence emitted under action of the applied near ultraviolet light.

While in the foregoing description we have described certain specific embodiments of the invention, it is to be understood that the same are to be taken by way of illustration and not in limitation except as may be defined in the appended claims.

What is claimed is:

1. A solid solution of the o-toluic acid and benzoic acid salts of one metal selected from the group consisting of sodium, potassium, lithium, calcium, magnesium, cadmium and lead, said solid solution containing from about 1 to 90% by weight of the o-toluic acid salt and in the hydrate form of the salts thereof being radiophotoluminescent.

2. A solid solution of the o-toluic acid and benzoic acid salts of lithium, said solid solution containing from about 1 to 90% by weight of the o-toluic acid salt and being radiophotoluminescent.

3. A radiation dosimeter comprising particles of a radiophotoluminescent solid solution of the o-toluate and benzoate of lithium containing from about 1 to 90% by weight of the o-toluate and supported by means allowing measurement of intensity of luminescence therefrom.

References Cited in the file of this patent

UNITED STATES PATENTS 2,738,429   Goldblith _____ Mar. 31, 1956

OTHER REFERENCES

Beilstein, Vierte Auflage, vol. 9, p. 83 (1949).